Dec. 12, 1939.  E. N. KEMLER  2,183,078
STRAIN GAUGE
Filed May 25, 1936  3 Sheets-Sheet 1
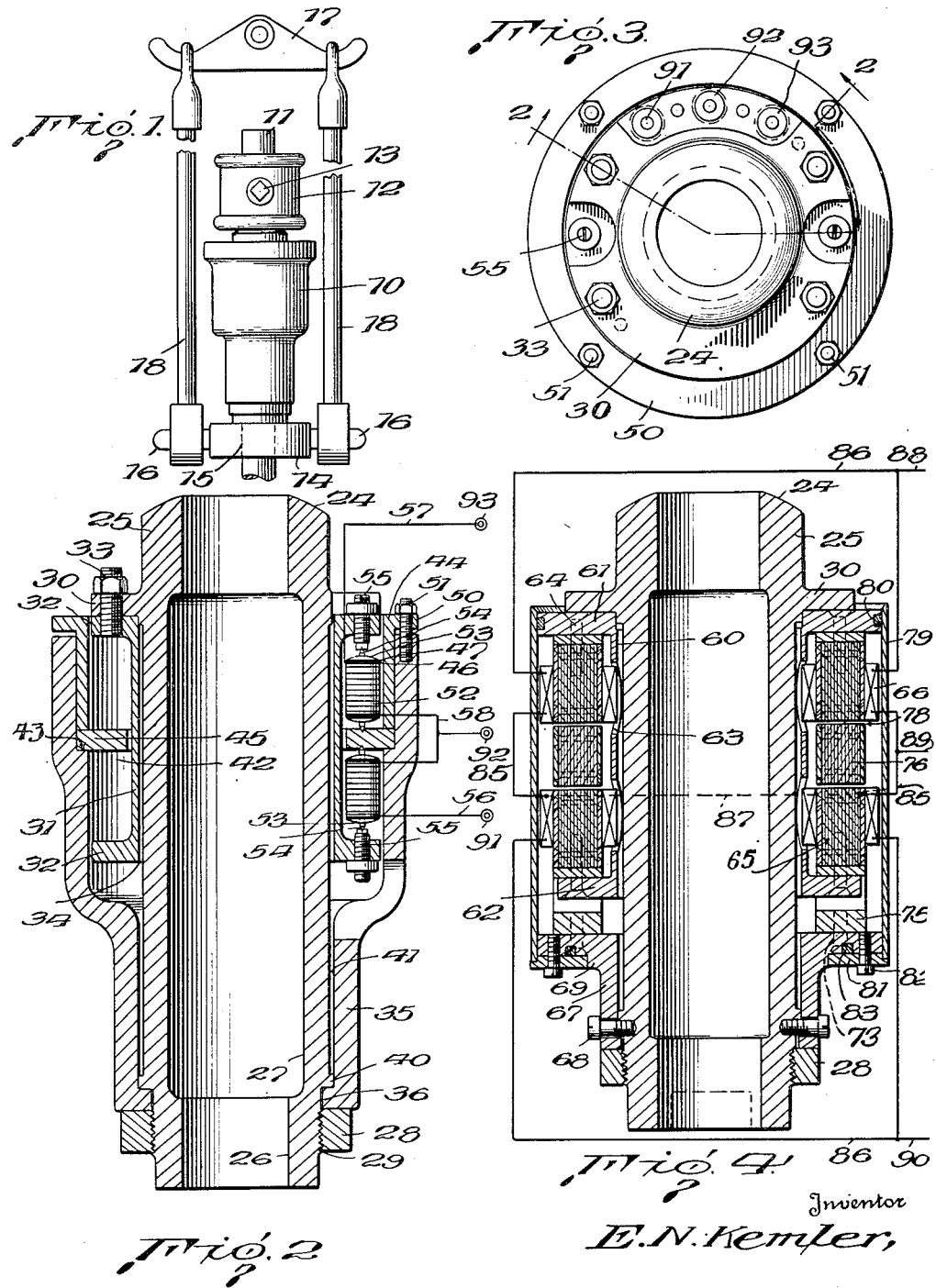
Inventor
E. N. Kemler,
By A. M. Houghton
his Attorney Dec. 12, 1939.  E. N. KEMLER  2,183,078
STRAIN GAUGE
Filed May 25, 1936    3 Sheets-Sheet 2
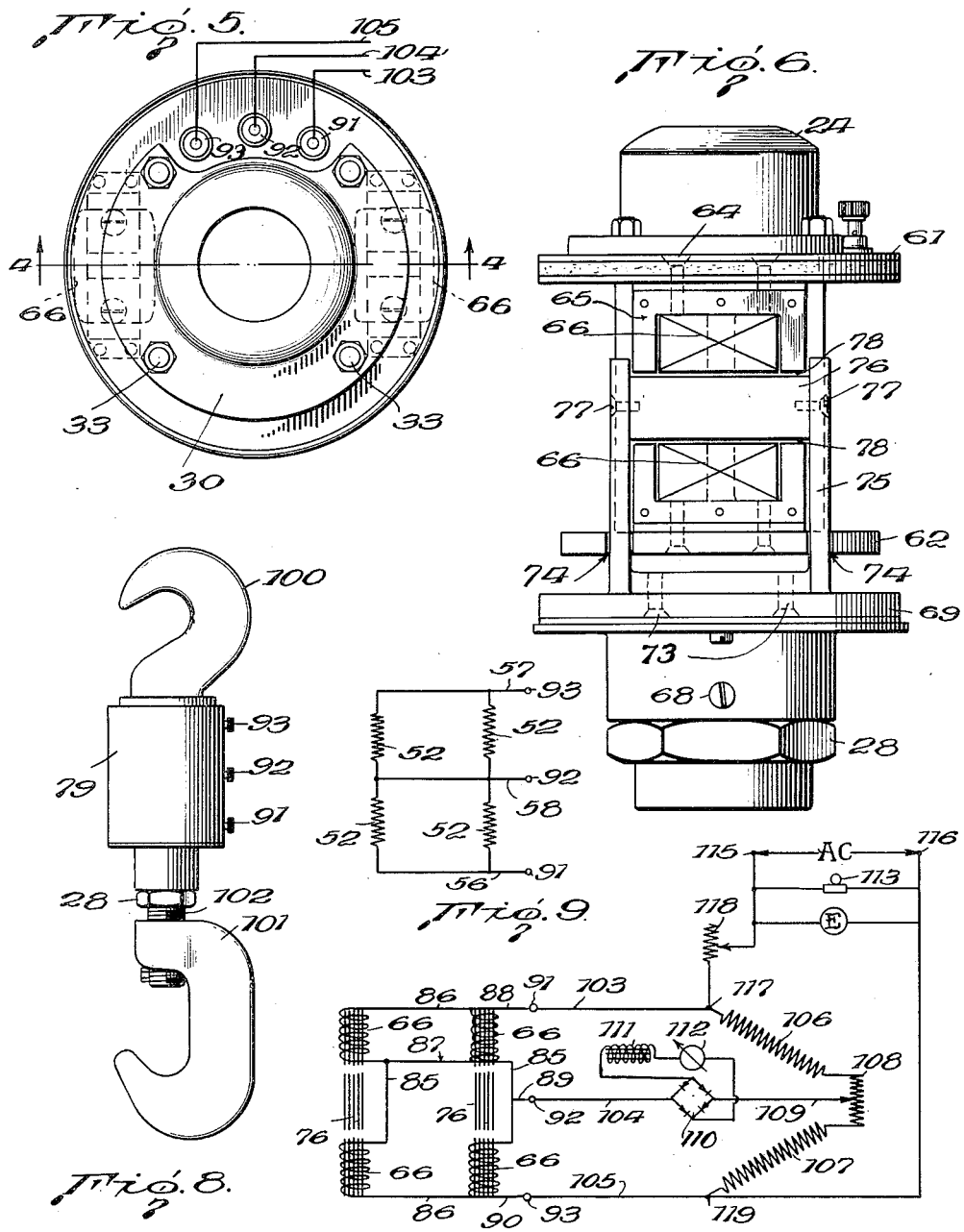

Dec. 12, 1939.  E. N. KEMLER  2,183,078
STRAIN GAUGE
Filed May 25, 1936  3 Sheets-Sheet 3

Inventor
E. N. Kemler,
By
Attorney

Patented Dec. 12, 1939

2,183,078

UNITED STATES PATENT OFFICE 2,183,078

STRAIN GAUGE

Emory N. Kemler, Glenshaw, Pa., assignor to Gulf Research & Development Company, Pittsburgh, Pa., a corporation of Delaware Application May 25, 1936, Serial No. 81,788

7 Claims. (Cl. 265—1)

This invention relates to strain gauges; and it comprises a gauge adapted to give an indication proportional to strain, comprising a standard member of known elastic properties and adapted to be subjected to stress, and a plurality of strain responsive elements mounted between spaced points on the standard member in such manner that strain in the standard member is communicated to said elements, said strain responsive elements further being so located with respect to each other and to the standard member that strains are indicated correctly even when the stress applied to the standard member is such as to bend or warp it in addition to changing its length; all as more fully hereinafter set forth and as claimed.

When a structural member is subjected to stress, that is to say a force tending to distort the shape of the member, a measurable strain is produced; an elongation or other distortion of the member. It is often required to measure stresses in a member in such things as struts, pump rods and connecting rods for example. In the case of stresses well within the elastic limit of the material composing the member, stress is proportional to strain (Hooke's law), the factor of proportionality depending on the elastic qualities of the member, and a measurement of the strain is readily interpreted as an indication of stress or load. Accordingly, strain gauges are in use, which measure strain in a member subject to stress; and from the strain measurements the stress can be calculated.

Strain gauges are of several types, among the most important of which are the mechanical, hydraulic and electrical types. The simplest type of strain gauge merely comprises mechanical motion amplifying or multiplying means, such as levers and gears, which give a magnified indication of strain in a member. In mechanical dynamometer type gauges, an elliptical or other type of spring is provided, adapted to be flexed by the mechanism under test and mechanical means of some sort, such as motion-magnifying levers, are provided for indicating the extent of distortion of the spring. In hydraulic gauges, a piston, diaphragm or bellows is arranged to be put under pressure by the mechanism, and strain is indicated by a fluid pressure gauge or its equivalent. In the electrical type, which is now superseding these other types in some relations on account of its greater possibilities for accuracy, an element is provided which gives a varying electrical response or a change in some electrical characteristic upon its being subjected to stress, and this element is fitted into a carrier frame so arranged that the element is adapted to be stressed by the operating stresses applied to the mechanism under test. The element often comprises two piles of carbon discs, which vary in resistance with pressure; or electromagnetic devices having parts arranged so that their separation varies under stress, changing the electromagnetic characteristics of the circuit in which they are connected. Piezoelectric devices embodying a suitable crystal for example, and giving a change in an electrical characteristic under pressure, find some use. The electrical type is better adapted for recording than the other types described. An electrical response is readily recorded by means of an oscillograph, having a galvanometer, optical system, and photographic recording means.

These electrical gauges are theoretically capable of a high degree of accuracy. The elements, when subjected to a force constrained in a strictly straight line direction, do indeed afford an accurate indication of the force. However, in certain types of mechanism, there may occur deformation, not in the direction of the stress under measurements, due to eccentric loading, which produces bending moments. These are reflected in the indication from the element, as a spurious indication. This disadvantage is not the fault of the electrical elements themselves, but rather in the way in which they have been mounted.

For example, a common dynamometric problem is the measurement of varying strains in a reciprocating member such as a pump rod, piston rod or the like. Gauges for this purpose comprise a frame which is clamped on the rod at two points spaced along the length of the rod and contains an electrical element. Varying stresses in the rod have the effect of varying its length between the points at which the gauge is attached and the variation in length is communicated from the frame to the electrical element. If the strain takes place entirely in a straight line direction back and forth, gauges of this type, properly adjusted, accurately reflect strain. But in many cases bending moments due to eccentric loading are present, and the rod is not distorted, under stress, in a strictly axial direction. It warps, bends and twists; and these aberrations are communicated to the gauge and affect the indication. I have found that in such mechanism as well pump rods, the strains resulting from bending are sometimes of the same order of magnitude as those resulting from the direct load. A single gauge of the type described does not give a true indication of the actual load under such conditions. Huge errors can be, and often are, introduced.

Another disadvantage of conventional gauges is that their use requires the mechanical properties of the member to which it is applied, to be known. For example, the modulus of elasticity must be known for a pump rod. The modulus can be determined by tests on a sample of the metal from which the rod is made. It varies considerably for different metals; and even among common steels of similar general characteristics it varies as much as 8 per cent above or below an average value. Determination of the value for the modulus to use in making calculations from the strain gauge readings, is a source of trouble and error.

One object achieved in the present invention is the provision of an electrical strain gauge of high accuracy and in which errors due to bending effects or eccentric loading are eliminated.

Another object achieved is the provision of a gauge by means of which accurate strain measurement is possible, independently of the elastic properties of the member under test.

A third object achieved is the provision of a gauge of outstanding portability, ruggedness and ease of application, and one which is thoroughly protected from dust, water, corrosive gases, etc.

A fourth object is the provision of a gauge in which it is not necessary to make temperature corrections.

A fifth object is to provide a gauge in which necessity for adjusting the gauge prior to each use is done away with.

These and other objects are achieved by providing a gauge having a standard test member of elastic material, usually cylindrical and adapted to be applied to a portion of the mechanism or structure under strain and to be subjected to strain thereby. A plurality of electrical elements (usually two in number) are arranged on the member in such manner as to be compressed or expanded according to changes in length of the standard member and to give a corresponding electrical indication. The elements are arranged symmetrically with respect to at least one of the two principal axes of inertia of the standard element and are spaced at equal angles throughout 360 degrees. With this arrangement any force tending to warp or bend the standard element affects some of the elements in a plus direction, so to speak, and others in an equivalent minus direction, so that the net effect of the disturbing stress is zero, as will be clear from the extended description to follow. In my gauge errors due to bending are eliminated.

In the accompanying drawings I have shown, more or less diagrammatically, four examples of specific embodiments of apparatus within the scope of the invention. In the showings, Fig. 1 is a view in elevation of the gauge showing how it is applied to a pump rod;

Fig. 2 is a view in vertical section along line 2—2 of Fig. 3, of one modification of gauge, using resistance elements;

Fig. 3 is a plan view of the device of Fig. 2;

Fig. 4 is a view in vertical section of a modification having electromagnetic strain responsive elements;

Fig. 5 is a plan view of the device of Fig. 4;

Fig. 6 is a view in elevation of the device of Fig. 4 with the cover removed, showing one of the elements;

Fig. 7 is a diagram of an electrical circuit for the gauge of Figs. 4 to 6;

Fig. 8 is a view in elevation of a modification of the gauge adapted for general dynamometric purposes;

Fig. 9 is a diagram showing the electrical connections in the gauge of Figs. 2 and 3;

Figure 10:
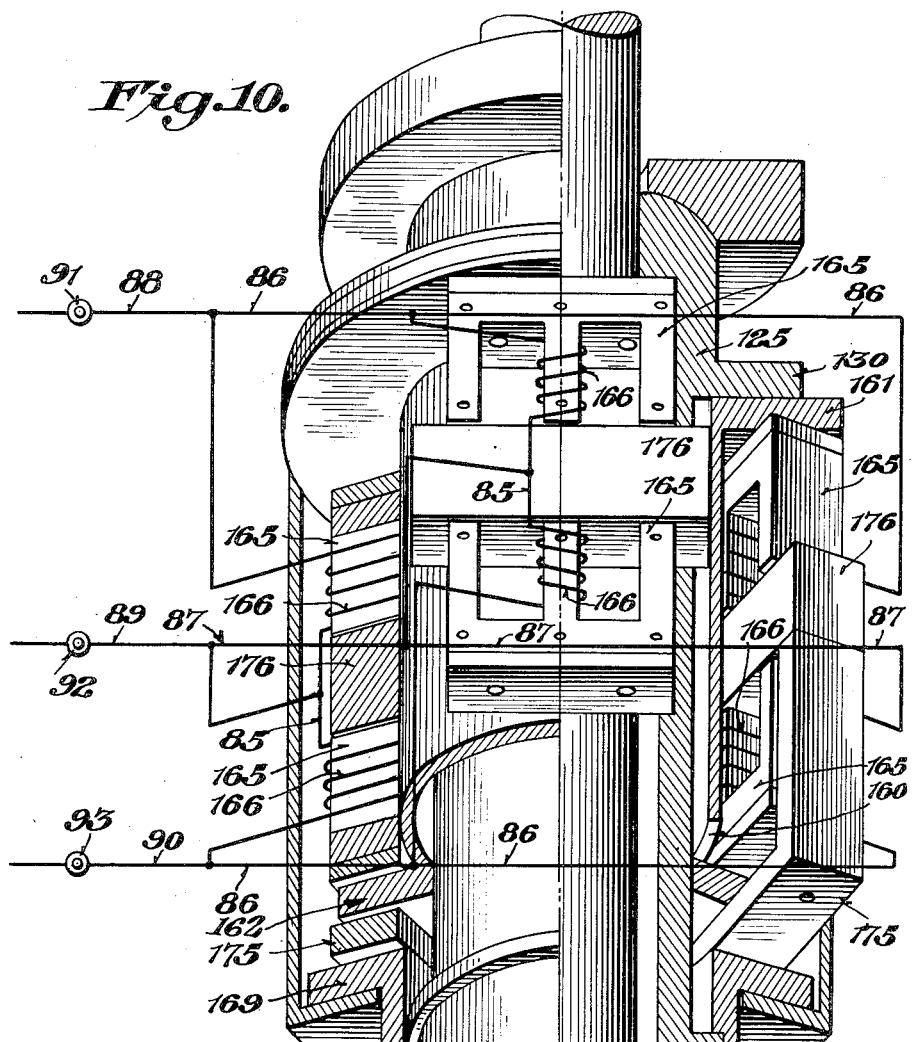
Fig. 10 is an isometric view, partly in section, of a modification employing three strain responsive elements.

In the showings, in which like reference characters indicate like parts throughout, Fig. 1 shows any one of the gauges of the invention, indicated at 10, applied to an oil well pumping rod; a typical application. The polished rod 11 of the pump extends vertically as shown and is provided with a collar 12 clamped on the rod by a screw 13. A hanger cross-bar 14 provided with a bore 15 and arms 16 is slidably fitted on the rod. A hanger yoke 17, adapted to be reciprocated vertically by an engine and suitable power transmitting mechanism (not shown) is operatively connected to the arms of cross-bar 14, by links 18. Ordinarily, the cross-bar engages the collar and the hanger draws the pump rod upward through the linkage shown; the rod returning by gravity. The gauge of the invention is positioned, as shown, between the cross-bar and the collar, so that the pump rod is driven through the gauge, the gauge taking the full driving stress.

Fig. 2 is a view in vertical section of one type of gauge, employing resistance elements which change in electrical resistance under pressure. As shown, the gauge comprises a standard member or standard section 25 of generally cylindrical shape and provided with a concentric cylindrical bore 26 adapted to fit on the polished rod. This member is generally made of metal and is of known elastic properties; that is its strain is known for any given stress. The bore is enlarged in the interior as at 27 to allow bending of the shaft without its being communicated to the standard member. The upper end of the standard section is rounded off spherically, as at 24, to provide automatic centering of the gauge and to compensate for any lack of parallelism between the cross-bar and the clamp. The member is provided at one end with a collar 28 threaded thereon as at 29 and at the other end with a flange 30. To flange 30 is attached a sleeve 31 having flanges 32 at each end. The upper flange is bolted firmly to flange 30 by studs and nuts 33. A slight clearance is left between the sleeve and the standard member as indicated at 34. A bell-shaped housing 35 is provided at its lower end with a rim 36 firmly clamped to the standard member, abutting a flange 40 on the standard member on one side and ring 28 on the other side. Clearance is left between the housing and the standard member as indicated at 41. The housing is enlarged upwardly, defining an annular chamber 42 having an annular shelf 43. This shelf supports a second sleeve 44, through a ring 45, as shown. The upper rim of sleeve 44 is provided with a flange 50 by means of which the sleeve is bolted to the housing, with studs and nuts 51. With this arrangement, upon variations in the length of the standard member due to stress, the housing and ring 45 move axially with respect to sleeve 31.

I provide, between flanges 32 and ring 45, resistance piles, shown as cylindrical stacks of carbon discs 52 provided at each end with metal caps 53 having fulcrum points 54. The fulcrum points at one end of each stack engage ring 45, as shown. Flanges 32 carry adjusting studs and nuts 55, engaging the other fulcrum points. The stacks are put under a slight initial compression, approximately equal for all stacks, by screws 55. This adjustment needs to be checked only infrequently. Flat metal shims or discs are provided at each end of piles 52, insulated from the fulcrum caps 53 by insulating spacers 47. Electrical connections are made to outer shims 46 by wires 56 and 57, and to the inner shims by a wire 58. In the example shown, two couples of stacks are provided, diametrically opposed (Fig. 3). The stacks are symmetrically disposed with respect to the principal axes of inertia of the standard member, which axes are any two radii at right angles to each other, because of the symmetry of the cylinder. The stacks lie at equal distances from the axis.

The two couples are connected electrically in parallel, as indicated in Fig. 9, binding posts 91, 92 and 93 being provided as shown in Fig. 3 and as indicated diagrammatically in Fig. 2. Each strain responsive element comprises a pair of stacks of discs 52.

In operation, when the gauge is positioned on a piece of apparatus as indicated in Fig. 1, the shortening in length of standard member 25, under compression stress, has the effect of compressing the upper stacks 52 and expanding the lower stacks 52; parts 30, 32 and 31 move downward with respect to parts 35 and 45. The electrical resistance varies accordingly and this is made use of in getting an electrical indication, the resistance elements being connected into a modified Wheatstone bridge arrangement, in a manner known per se. In such circuit, one arm of the bridge would be formed between posts 91 and 92, and another arm between posts 92 and 93. The diametrically opposed stacks are connected electrically in parallel. If the standard section is bent by flexing of the polished rod, then if the bending takes place in a plane normal to the line joining the diametrically opposed elements (Fig. 3), they are not affected. If bending takes place in some other plane, for example in the plane including the elements, there is an abnormal positive effect produced on one of the elements and by reason of the symmetrical disposition of the elements, an equal, abnormal negative effect is produced on the element opposite. The distorting force thus cancels out and is not reflected in the indication. For example, if the standard section 25 be warped so as to bulge convexly to the left, the upper right-hand and lower left-hand carbon piles will be compressed while the lower right-hand and upper left-hand piles will be expanded to a corresponding degree, thus nullifying the effect of the warping.

The compensating effect of my apparatus is based on the following considerations. When the standard member is subjected to an eccentric load, that is, a load not in a direction passing through the centroid or center of gravity of the section, such load can be replaced, mathematically speaking, without changing the behavior of the member, by a bending moment or couple which will give the same bending moment as the eccentric load, and a direct load equal in magnitude to the eccentric load at the center of gravity. This applies to relatively short members, such as the standard element of the present gauge, in which the ratio of length to diameter is less than about 20:1.

If the eccentric load is applied in a plane not containing the strain-responsive elements, there will, therefore, be an effect produced both in the plane of the elements and in the plane perpendicular to them. Applying the same principle, this eccentric load can be replaced by a direct load at the center of gravity, and the bending moment divided into two components, one in the plane of the strain responsive elements and the other in a plane at right angles to the measuring elements. Any deflections in a plane at right angles to the measuring elements, caused by the bending moment, will not affect the compression since in this case the plane of the strain responsive elements becomes a neutral axis for this component. The other component of the bending moment will cause the same effect as mentioned above, and it will, therefore, be balanced out. Only the direct load affects the strain responsive elements.

Fig. 4 shows a modified type of strain gauge based on electromagnetic principles. This gauge has a standard section similar to that in Fig. 2. Attached to upper flange 30 is a sleeve 60 having a broad upper flange 61, a lower flange 62, and cut-out openings 63. Attached to the upper flange, by screws 64, are two rectangular pole-pieces composed of iron laminae 65 upon which are wound coils of insulated wire 66. A similar pair of pole pieces having lamina 65 and coils 66 are attached to the lower flange 62 as shown. Both pairs of pole-pieces are thus in rigid connection with the standard section at the upper part and move with it. The standard section is provided with a collar 67 firmly fastened to the lower portion of the standard section by screws 68 and clamped additionally by collar 28. Collar 67 is provided with a flange 69, as shown. Mounted on the flange by screws 73 are two U-shaped yokes 75 (Fig. 6) at the upper ends of which are attached laminated iron armatures 76 by screws 77. Recesses or slots 74 are provided in flange 62, as shown, to clear yokes 75. A slight clearance or air-gap is left between the pole pieces and the armature as indicated at 78. The device is provided with a thin cover of metal or the like indicated at 79 (left off in Fig. 6) fitting ring 61 and flange ring 69. A gasket seal 80 is provided between the cover and ring 61 to allow sliding motion, while providing a weather-tight seal. The cover is retained to flange 69 by ring 81 screwed to the flange by screws 82 and provided with a water-tight gasket seal 83.

The electrical connections for this modification include wires 85 connecting one end of each set of coils and wires 86 connecting the other end. The coils are also joined by wire 87 as shown. Wires 88, 89 and 90 lead from wires 86 and 85 to binding posts 91, 92 and 93. On subjection of the standard section to stress, each armature is moved toward one pole piece and away from the other pole piece, thereby changing the reluctance of the magnetic circuits.

In the resistance element gauge modification, the standard section can be of any suitable material, such as steel or bronze for example. In the electromagnetic gauge the standard section and other parts, except the armature and pole pieces, are best made from non-magnetic material such as aluminum or a suitable non-magnetic stainless steel. Aluminum works well, and has the advantage of reducing the mass of the gauge. In any case, the modulus of the material of the standard section can be determined once for all, and the modulus for the material of the member under test need not be considered.

While the device has been described specifically as adapted for application to a reciprocating rod, it is readily adaptable as a general dynamometer. Fig. 8 shows such a modification. A hook 100 is attached to the upper portion of the standard member and a second hook 101 is threadedly attached to the lower portion by means of a threaded extension 102 on standard section 25. The device is thus adapted to measure stresses applied to the hooks.

Fig. 7 is a diagram of a typical circuit embodying the electromagnetic gauge of Figs. 4 to 6 and 10. Wires 103, 104 and 105 lead from binding posts 91, 92 and 93. Two resistances, 106 and 107, are provided forming two of the arms of a modified Wheatstone's bridge. The resistances are connected through a potentiometer having a resistance element 108 and variable connection 109. Variable connection 109 is connected, through indicating or recording mechanism, and wire 104, with post 92. The indicating means is shown as comprising a rectifier 110, conveniently of the copper oxid type, in circuit with wires 104 and 109 and in series with a choke coil 111 and galvanometer or equivalent indicating or recording device indicated at 112. An A. C. potential is imposed across resistances 106, 108 and 107, by a source of high frequency A. C. across wires 115, 116. A signal lamp 113 is shown connected across wires 115 and 116. Wire 115 is connected to the junction 117 of resistance 106 and wire 103, through a variable resistance 118, as shown; and wire 116 is connected directly to the junction 119 of wire 105 and resistance 107. A voltmeter E is connected across wires 115 and 116 as shown.

In operation, the A. C. source is applied and a zero setting is made for the indicating means by adjusting the variable contacts of resistance 118 and potentiometer 108. The rectifier 110 converts the high frequency A. C. in the circuits, to pulsating D. C.; and the choke coil is for damping out the pulsations so that the galvanometer is supplied with uniform D. C. When the gauge is now subjected to strain, the bridge is unbalanced, and the indicating means indicates a deflection. When the indicating means give a linear response, as is ordinarily provided, the deflection is proportional to strain in the gauge and hence to stress in the member under test.

In the embodiments shown in Figs. 2–6, the standard element is symmetrical; it is a cylinder of circular cross-section. Also in these embodiments only two strain-responsive elements are shown, these being located on the gauge diametrically opposite each other and at the same distance from the major axis of symmetry of the cylinder. This is, on the whole, the simplest and most convenient construction. Only two elements are required, and the symmetrical standard section is readily formed as by turning in a lathe. It is easier to make the standard element symmetrical than otherwise. However, alternative arrangements of elements are possible while achieving the same result: accurate strain indication with compensation for bending strains. Thus, using a symmetrical standard section, more than two strain responsive elements can be employed, provided they are mounted equidistant from the major axis of symmetry and are spaced at equal angles through 360 degrees. Fig. 10 exemplifies such a modification, utilizing three strain responsive elements spaced at 120 degree angles. The device is similar to that shown in Figs. 4–6, and comprises a standard section 125 with flanges 130 and 169 functioning similarly to elements 25, 30 and 69 in Figs. 4–6. As shown three armatures 170 are provided, attached to flange 169 through U-shaped standards 175. Upper and lower pole pieces 165 having coils 166 are mounted on flanges 162 and 161 on sleeve 160 as shown, in a manner similar to the arrangement of the corresponding parts 65, 66, 61, 62 and 60 respectively of Figs. 4–6. The three coils are interconnected, as shown, by wires 86, 87 and 85, leads 88, 89, 90 being attached as at 91, 92, 93 to the recording system (Fig. 7). The device is installed and operated as described for the two-element gauge. Bending moments affect the strain-responsive elements in such manner as to give complete compensation.

The conditions to be met in providing a gauge which will eliminate the effect of bending stresses are as follows: assuming the standard member to be a cylinder, prism or other shape having parallel walls, such cylinder will have an axis normal to the plane of a right cross-section and passing through the center of gravity of the cross-section. Then the strain-responsive elements are mounted equidistant from this axis; spaced at equal angles throughout 360 degrees; and symmetrically disposed with respect to at least one of the two principal axes of inertia. (In every plane area, a given point being taken as the origin, there is at least one pair of rectangular axes in the plane of the area about which the moment of inertia is a maximum, and a minimum about the other. These moments of inertia are called the principal moments of inertia, and the axes about which they are taken are the principal axes of inertia. Axes of symmetry of an area are always principal axes of inertia.) If two elements are used they can lie anywhere with respect to the principal axes of inertia provided they are 180 degrees apart and are equidistant from the axis. If three elements are used, one of them must lie on either one or the other of the principal axes of inertia in order to meet the condition of symmetry.

Figure 11:
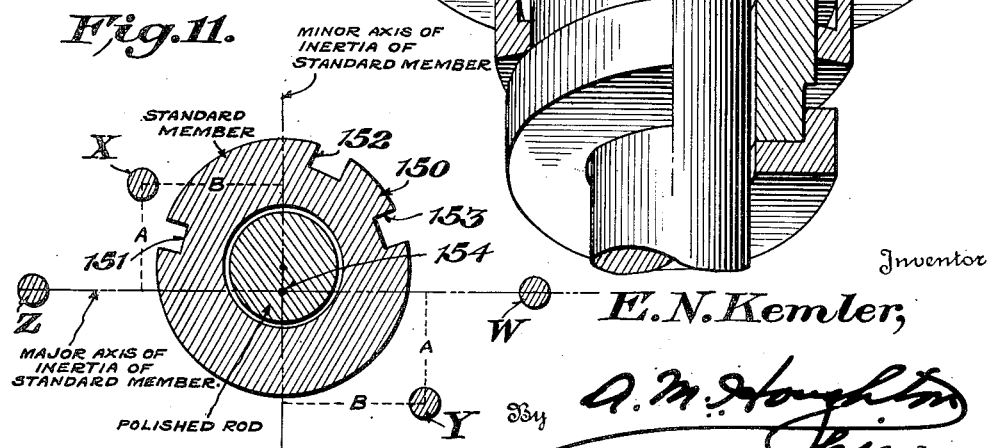
Fig. 11 is a diagram showing the invention applied to a non-symmetrical standard member.

When the standard element is a circular cylinder (the most convenient form) the strain responsive elements are simply mounted equidistant from the axis of the cylinder and spaced at equal intervals throughout 360 degrees. However, while it is convenient to have the standard member symmetrical, this is not necessary. Non-symmetrical members can be used provided the three requirements noted ante are met. Fig. 11 is a diagram showing the adaptation of the invention to a non-symmetrical standard member. As shown, the standard member 150 is a cylinder of non-circular cross-section, i. e. having grooves 151, 152 and 153 disposed in such manner as to destroy the symmetry. In this case two strain-responsive elements may be employed disposed either (1) both lying along either the major or the minor axis of inertia and spaced the same distance from the intersection 154 of said axes; e. g. as indicated diagrammatically at W and Z; or (2) at X and Y, both spaced so that the distance of each from the major axis is the same and the distance of each from the minor axis is the same; that is so that A=A and B=B in the figure. In each case the two elements are symmetrically disposed with respect to the axes of inertia. Point 154 is the center of gravity of a right cross section of the standard member.

In such a modification the use of two strain-responsive elements rather than a greater number is advantageous. With an unsymmetrical section, and three or more elements, at least one of the strain-responsive elements must be located on one of the principal axes of inertia in order to fulfil the condition of symmetry. Using but two elements, it is sufficient to locate the elements at light distances from the two principal axes.

As stated, it is usually simpler to provide a circular cylindrical standard member.

The rugged construction of the gauge is apparent. It is not damaged or thrown out of adjustment even when dropped. The gauge is fully protected against dust, rain, etc. which is an especially important feature in connection with the magnetic modification because of the small air gap in this type of gauge. Dust accumulating in air gaps of this type of gauge, or corrosion of the armatures and pole pieces, can introduce considerable error. These parts are protected in my gauge.

It is usually best to make the gauge of the same material throughout. Then no errors are introduced by temperature changes; this being true regardless of the nature of the member to which the gauge is applied. Ordinary clamp-on type gauges do not have this property except in the accidental case when they are made throughout of the same material as the part of the mechanism to which they are applied.

The present application is a continuation-in-part of my prior application, Serial No. 14,539, filed April 3, 1935.

What I claim is:

1. A strain gauge adapted to be applied to an element subjected to stress by another element and to give an accurate electrical indication of strain, comprising an elongated symmetrical standard section of known elastic properties, the section being capable of supporting stress but deforming under stress, and adapted to be interposed between the element subjected to stress and the element applying stress to said element, the axis of symmetry of the standard section substantially coinciding with the direction of applied stress, a housing fixed to the standard section near one end thereof and spaced closely therefrom near the other end, to define a narrow clearance space, a plurality of pairs of axially alined stacks of resistance elements, means for mounting the opposite ends of each pair of stacks fixedly to the end of the standard section opposite from that to which the housing is attached, in symmetrically disposed relation with respect to the standard section, means near the unsupported end of the housing for engaging the proximate ends of each pair, so that upon axial change of length of the standard section one stack in each pair is compressed and the other is expanded, and means for electrically interconnecting the strain responsive elements, so that strains in the direction of the axis of the standard section are indicated accurately while bending strains are nullified.

2. A strain gauge adapted to be applied to an element which is subjected to stress by another element and to give an accurate electrical indication of strain, comprising an elongated symmetrical standard section of known elastic properties, the section being capable of supporting stress but deforming under stress, and adapted to be interposed between the element subjected to stress and the element applying stress to said element, the axis of symmetry of the standard section substantially coinciding with the direction of applied stress, a plurality of pairs of iron pole pieces having wire coils wound thereon, means for mounting each pair of pole pieces in spaced relation from one end of the standard section so that each pair of pole pieces is a rigid unit with one end of the standard section, the several pole pieces being in symmetrically disposed relation with respect to the standard section, a plurality of armatures interposed between the spaced pole pieces and spaced closely therefrom, and means for supporting the armatures from the other end of the standard section so that they form a rigid unit with said end, so that change in length of the standard section under the influence of applied stress varies the separation between the armatures and the pole pieces and thus varies the electromagnetic characteristics of the magnetic circuits, a housing for protecting the armatures and pole pieces from the air, said housing being attached to the standard section adjacent one end thereof, and means providing a yielding but weather-tight joint between the housing and the other end of the standard section.

3. A gauge for measuring strains in deep well pump rods and like members which are operated through the agency of a stress-applying member, said gauge comprising an elongated tubular member of known elastic properties, adapted to surround the rod and fit loosely thereon and so constructed and arranged as to transmit the full operating stress from the stress-applying member to the rod, so that upon application of such stress the tubular member is strained longitudinally proportionally to the stress applied thereto, a plurality of elements adapted to give an electrical response proportional to strain, and supporting means for said strain responsive elements adjacent each end of said tubular member, so that strain of the standard member is communicated through the supporting means to the strain responsive elements, said strain responsive elements being spaced at equal angles throughout 360 degrees about the tubular member, so that strains are indicated correctly even when the stress applied to the tubular member is such as to bend or warp it in addition to changing its length.

4. A strain gauge suitable for measuring strains in rods and the like under the action of stress-applying means, and adapted to be interposed between the rod and the stress-applying means, said gauge comprising an elongated elastic member of known elastic properties, of regular shape and having an opening extending therethrough along the long axis to loosely receive the rod extending through the member, so that upon application of stress the elongated member changes in length, a plurality of electrical strain-responsive elements arranged symmetrically about the long axis of the elongated elastic member, means for mounting the strain-responsive elements between points on the elongated member spaced along the direction of said long axis, and electrical means for inter-connecting the strain-responsive elements; so that strain of the elongated member is communicated to the strain-responsive elements and correct strain indications are afforded despite any bending of the axis of the elongated member.

5. A strain gauge comprising a standard member of elongated regular shape, of known elastic properties and adapted to be stressed in the direction of its length, a plurality of means spaced symmetrically about the standard member, for measuring change of length between longitudinally spaced points on the standard member, a housing surrounding said means and protecting them, said housing being attached to the standard member adjacent one end thereof, and means providing a yielding but weather-tight joint between the housing and the other end of the standard member.

6. A strain gauge comprising a standard member of elongated regular shape, of known elastic properties and adapted to be stressed in the direction of its length, and to transmit stress to an element the strains in which are to be measured, a plurality of means spaced symmetrically about the standard member and so constructed and arranged as to measure change in length between longitudinally spaced points on the standard member, a housing surrounding said means and protecting them, said housing being attached to the standard member intermediate the ends thereof and being so constructed and arranged as to closely fit around the standard member while imposing negligible frictional resistance to distortion of the standard member.

7. The gauge of claim 6 wherein the standard member is centrally orificed along the direction of elongation thereof, so as to surround and fit loosely upon the member the strains in which are to be measured.

EMORY N. KEMLER.